(12) United States Patent
Chadima (10) Patent No.: US 7,726,552 B2
(45) Date of Patent: Jun. 1, 2010

(54) SYSTEM FOR SECURE COLLECTION AND DISPOSAL OF LARGE VOLUMES OF DOCUMENTS

(76) Inventor: Mike Chadima, 1875 W. Beltline Rd., Cedar Hill, TX (US) 75104

( * ) Notice: Subject to any disclaimer, the term of this patent is extended or adjusted under 35 U.S.C. 154(b) by 861 days.

(21) Appl. No.: 11/512,952

(22) Filed: Aug. 30, 2006

(65) Prior Publication Data

US 2008/0054059 A1     Mar. 6, 2008

(51) Int. Cl.
*B65G 11/04* (2006.01)
(52) U.S. Cl. .................. 232/44; 232/1 D; 229/102; 229/125.22; 229/125.38
(58) Field of Classification Search ............. 232/43.2, 232/44, 45, 1 D; 229/102, 125.38, 125.19, 229/125.22, 125.21, 125.37; 220/23.87, 220/214; 206/807
See application file for complete search history.

(56) References Cited

U.S. PATENT DOCUMENTS

| | | | |
|---|---|---|---|
| 1,130,271 A | 3/1915 | Hammond | |
| 1,646,665 A | 10/1927 | Smith | |
| 2,559,320 A | 7/1951 | Rushing et al. | |
| 3,116,007 A | 12/1963 | D'Esposito et al. | |
| 3,642,193 A | 2/1972 | Rada | |
| 3,958,747 A | 5/1976 | Chipp et al. | |
| 4,196,843 A | 4/1980 | Garmon | |
| 4,927,074 A | 5/1990 | LaRue et al. | |
| 5,040,722 A | 8/1991 | Fromion et al. | |
| 5,050,794 A | 9/1991 | Wischusen, III | |
| 5,205,477 A | 4/1993 | Zimmermann | |
| 5,699,959 A | 12/1997 | Huspeka et al. | |
| 6,296,175 B1 | 10/2001 | Dixon | |
| 2006/0043160 A1 | 3/2006 | Clark | |
| 2008/0179384 A1* | 7/2008 | Diaz De La Rocha | . 229/122.32 |

\* cited by examiner

Primary Examiner—William L. Miller
(74) Attorney, Agent, or Firm—Schultz & Associates, P.C.

(57) ABSTRACT

The invention disclosed herein provides an apparatus and method for securely collecting, storing, and disposing of documents by attaching a reusable, secure, lockable closure to a cardboard receptacle box. The lockable closure has a slot in the top to allow documents to be deposited in the box. Two opposing side surfaces of the lockable closure have an interior lip that engages the box flap in such a way as to prevent the unwanted removal of the closure. The closure can be secured to the box with a locking seal such as a cable tie through locking holes located on the top surface and two opposing sides of the lockable closure as well as the box flaps and box sides. A hole allows removal of the lockable closure by exerting pressure on the flap. The disclosed method provides the steps of providing a single lockable closure, a plurality of receptacle boxes, and a number of locking seals capable of fitting through the holes. The single, reusable, locking closure is placed on a receptacle box, which is sealed, documents are placed into the box through the slot. When the box is full, the locking seals are removed and the box is closed secured with its internal flaps and shipped for destruction or recycling. The same lockable closure is then placed on a different box bottom to repeat the process.

43 Claims, 6 Drawing Sheets

SYSTEM FOR SECURE COLLECTION AND DISPOSAL OF LARGE VOLUMES OF DOCUMENTS

FIELD OF THE INVENTION

This invention relates to an apparatus and method for secure collection, storage, and disposal of documents. In particular, a preferred embodiment of the invention includes a single robust document collection closure sized to fit over a series of disposable document collection boxes adapted to be used with the document collection closure to collect a large number of documents and control access to them until destruction.

BACKGROUND OF THE INVENTION

An immense volume of paper is generated by working commercial offices. Large fractions of this volume of paper must be securely stored and securely destroyed to prevent theft of information. For example, offices which deal with consumer reports for business purposes in the United States are subject to the requirements of the Federal Fair and Accurate Credit Transactions Act of 2003 (FACTA) which requires proper disposal information of consumer reports and records to protect against "unauthorized access to use of the information". The "disposal rule" as it is known requires entities to follow appropriate measures to dispose of outdated consumer reports and all sensitive information derived from them.

In the prior art, disposal of large volumes of documents is usually accomplished by document shredding services. Document shredding services provide trucks with portable shredding equipment. The trucks transport the portable shredding equipment to the site at which the documents are located. A bonded courier then moves the documents from the office to the truck where they are shredded. The bonded courier can then attest to the secure handling and destruction of the documents once they leave the office.

U.S. Pat. No. 4,927,074 to La Rue discloses a container for storage and transportation of documents. The box includes a closure. Cable ties are threaded through grommet holes in the closure and the handles in the box to secure the closure and box together. However, the box and closure are designed to be used together to form a closed and sealed document transportation container. Once sealed, additional documents cannot be added without breaking the seals. Also the box cannot be closed and sealed without the corresponding closure.

U.S. Pat. No. 5,040,722 to Fromian discloses a packing box that is "self-locking". The box comprises a bottom having a plurality of sides. The sides of the bottom include flaps. The top includes a slot designated to accept the flaps. When the box is closed, the slots engage the flaps and prevent the top from being removed. To open the box, force is applied through a hole in the top to push the flap out of the slots. However, the box and the top are a single integral piece and cannot be separated without destruction of the box.

U.S. Pat. No. 1,130,271 to Hammond discloses a box used for packing articles. Outer flaps of the body of the box engage an inner lip of the cover. To remove the cover from the body, a force is exerted a hole to disengage the flaps from the inner lip. However, there is no provision made for addition of documents to the box after the box is secured. Further, no provision is made for preventing unwanted tampering with the contents of the box during transport. Further, no provision is made for closing and sealing the box without the removable cover.

U.S. Pat. No. 3,116,007 to D'esposito discloses an interlocking tray and detachable cover. Flanges on the tray flex outward to engage locking ridges on the inside of the cover. To remove the cover, a force is applied through a hole in the cover to the flanges to disengage the cover. However, there is no provision made for addition of documents to the box after the box is secured. Further, no provision is made for preventing unwanted tampering with the contents of the box during transport.

U.S. Pat. No. 3,958,747 to Chipp discloses a container which incorporates a "knock down" type bottom box and a closure closure. The closure closure comprises a strengthening frame having a side wall and inwardly turned flange. The bottom box comprises an outwardly turned flange. The flange on the box engages the flange on the closure to close the box. The flanges may be released by tabs on the flaps of the box. However, Chipp does not provide for the addition of documents once the closure closure has been sealed to the bottom box. Further, no provision is made for preventing unwanted tampering with the contents of the box during transport.

The prior art does not provide for secure collection of sensitive documents within the office on a large scale. The prior art provides only the use of boxes with dedicated closures which cannot be used for secure collection of documents on an ad hoc basis.

The prior art also does not provide for destruction of documents in remote geographic areas. For instance, in the prior art portable document destruction cannot be efficiently carried out outside of large metropolitan areas. For example, there is always a finite number of document destruction vehicles in a large metropolitan area. Since these vehicles are usually heavily utilized, it is impractical to send them to remote geographic areas to provide document destruction services. The reason, of course, is that the time that the document destruction vehicles are on the road is time that the document destruction equipment cannot be used. The farther the trucks must be sent from their home location to be used, the fewer documents can be destroyed and therefore the less efficient and more expensive the document destruction service becomes.

The prior art does not disclose or suggest a reusable document collection closure that can be repeatedly used with a plurality of boxes having integral tops. Moreover, the references listed above do not disclose or suggest a slot in the closure that allows documents to be placed in the box on an ad hoc basis after the closure has been secured to the box.

It is therefore a goal of the present invention to provide a document container system which provides a verifiable method of ad hoc collection, storage and transportation of a large number of confidential documents for destruction and that promotes the efficient destruction and storage of confidential documents in remote geographic locations.

SUMMARY OF THE INVENTION

The invention disclosed provides an apparatus and method for securely collecting, storing, transporting and disposing of large volumes of confidential documents by attaching a reusable, securable, lockable closure to many identical self sealing receptacle boxes. The lockable closure has a document entry slot sized to allow documents to be easily deposited in the box and at an angle that facilitates easy entry and space saving, non-jamming stacking. Two opposing side surfaces of the lockable closure extend beyond the edge of the outwardly folded box flap, with an interior lip that engages the box flap in such a way as to prevent the unwanted removal of the closure. A hole on the same opposing side surfaces allows a user to remove the lockable closure by exerting pressure on the flap thereby disengaging the flap from the interior lip so the lockable closure can be lifted off the box. The closure can be locked to the box with a seal such as a cable tie through locking holes located on the top surface and two opposing sides of the lockable closure as well as the box flaps and box sides. To prevent tampering with the box contents through the bottom of the box, the bottom flaps of the mating box can be secured with cable ties as well through properly aligned locking holes.

The method comprises the steps of providing a single lockable closure, a plurality of mating boxes having appropriate locking holes and flap dimensions to conform to the lockable closure, and a number of locking seals such as cable ties capable of fitting through the locking holes. In practice, the single, reusable, lockable closure is placed on a box and secured with cable ties. The cable ties can be numbered and documented to deter tampering. The bottom of the box is also secured with cable ties or sealed with adhesive strips. Documents are then placed into the box through the slot in the lockable closure. When the box is full, the locking seals on the top are removed, the flaps of the box are folded over to close the box, the top flaps are sealed with cable ties. The box is then shipped for destruction or recycling. The cable ties serve as objective verification that the contents of the box has not been disturbed. The same reusable, lockable closure is then placed on a different box bottom to repeat the process of ad hoc collection of documents at an office location.

The invention further discloses a system for secure document collection and storage comprising of a plurality of receptacle boxes; each receptacle box having a first opposing top flap pivotally adjoined to a first supporting wall and a second opposing top flap pivotally adjoined to a second supporting wall; each receptacle box having an open position and a closed position; while in the open position, the first opposing top flap having a first hole adjacent a first hole in the first supporting wall; in the open position, the second opposing top flap having a second hole adjacent a second hole in the second supporting wall; in the closed position, the first opposing top flap having a third hole and a fourth hole adjacent the second opposing top flap; in the closed position, the second opposing top flap having a fifth hole adjacent the third hole and a sixth hole adjacent the fourth hole; a reusable security closure, adjacent on of the plurality of receptacle boxes in the open position; the reusable security closure having a slot for admission of documents in ducted communication with the interior of the one of the plurality of receptacle boxes; the reusable security closure having a top, a first side connected to the top and a second side connected to the top; the first side having a first releasable latch means adjacent the first top flap when the one of the plurality of receptacle boxes is in its open position; the second side having a second releasable latch means adjacent the second top flap when the one of the plurality of receptacle boxes is in its open position; the top having a first hole adjacent the first side; the top having a second hole adjacent the second side; the first side having a first hole adjacent the top; the second side having a second hole adjacent the top; the first hole adjacent the first side and the first hole adjacent the top corresponding to the first hole in the first supporting wall and the first hole in the first opposing top flap; the second hole adjacent the second side and the second hole adjacent the top corresponding to the second hole in the second supporting wall and the second hole in the second opposing flap; a first destructible security seal within the first hole adjacent the first side, the first hole adjacent the top, the first hole in the first supporting wall and the first hole in the first opposing top flap; a second destructible security seal within the second hole adjacent the second side, the second hole adjacent the top, the second hole in the second supporting wall and the second hole in the second opposing flap; a third destructible security seal within the third hole in the first opposing flap and the fifth hole of the second opposing flap when the one of the plurality of receptacle boxes is in the closed position; a fourth destructible seal within the fourth hole in the first opposing flap and the sixth hold of the second opposing flap when the one of the plurality of receptacle boxes is in its closed position.

The invention further discloses a system for secure document collection and storage comprising of a plurality of receptacle boxes; each of the plurality of receptacle boxes comprising an integral box top closure having an open position and a closed position; a security closure removably attached to at least one of the plurality of receptacle boxes when the integral box top closure on the at least one of the receptacle boxes is in the open position; a document slot in the security closure in ducted communication with the interior of the at least one of the receptacle boxes; a first destructible seal means for joining the security closure to the at least one of the plurality of receptacle boxes; and at least one second destructible seal means for joining the integral box top closure to the at least one of the plurality of receptacle boxes.

The invention further discloses a method of secure document collection comprising the steps of providing a plurality of receptacle boxes each having an open position and a closed position; providing an integral top closure on each of the plurality of receptacle boxes; providing a security closure having an attachment means for removable attachment to at least one of the receptacle boxes and a document slot; choosing the at least one of the receptacle boxes; placing the at least one of the receptacle boxes in the open position; engaging the security closure to the at least one of the receptacle boxes adjacent the top closure; securing the security closure to the top closure with a first destructible seal; placing at least one document in the document slot; destroying the first destructible seal; disengaging the security closure from the at least one of the receptacle boxes; placing the at least one of the receptacle boxes in the closed position; securing the integral top closure with a second destructible seal; repeating the above steps with another of the plurality of receptacle boxes.

BRIEF DESCRIPTION OF THE DRAWINGS

In the detailed description of the preferred embodiments presented below, reference is made to the accompanying drawings.

DETAILED DESCRIPTION OF THE PREFERRED EMBODIMENT

In the descriptions that follow, like parts are marked throughout the specification and drawings with the same numerals, respectively. The drawing figures are not necessarily drawn to scale and certain figures may be shown in exaggerated or generalized form in the interest of clarity and conciseness.

Figure 1:
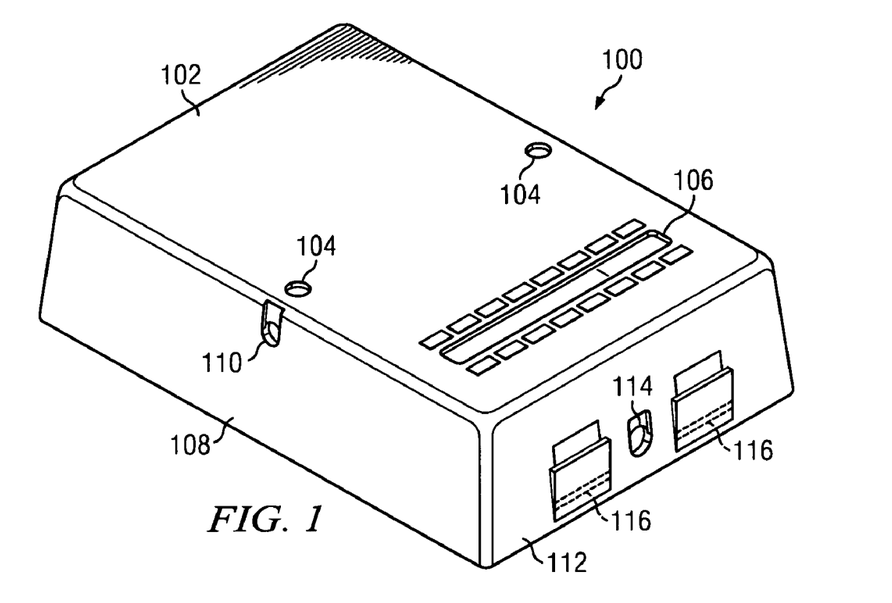
FIG. 1 is an isometric view of one embodiment of the lockable closure.

Referring to FIG. 1, a preferred embodiment of lockable closure 100 is shown. Top surface 102 includes two closure top locking holes 104 and document entry slot 106. Lockable closure 100 is composed of a material such as polyethylene or polypropylene to make it light, easy to maneuver, but robust enough to repeatedly engage and disengage from box top end flaps 202. Other materials such as composite fiberglass, waxed corrugated cardboard or Kevlar would also suffice. In extremely secure environments, diamond pattern plate steel or stainless steel may be employed. Two closure major side surfaces 108 each have closure side locking hole 110 aligned with each closure top locking hole 104 on top surface 102. Closure top locking hole 104 and closure side locking hole 110 are spaced to allow a sealing device, such as cable tie to be inserted. Holes 104 and 102 are spaced far enough apart to prevent removal of cable tie 402 by tearing through the material of the lockable closure. Two closure minor side surfaces 112 each have one release hole 114 centrally located and two interior latches 116. Interior latches 116 are located near the bottom edge and horizontally on the interior surface of closure minor side surfaces 112. Interior latches 116 are to engage box top end flaps 202 to secure lockable closure 100 to receptacle box 200 when the invention is in its second position. In other embodiments, the internal latches may be placed on the interior of the major side surfaces or both the major and minor side surfaces to engage the flaps of the receptacle box.

Figure 6:
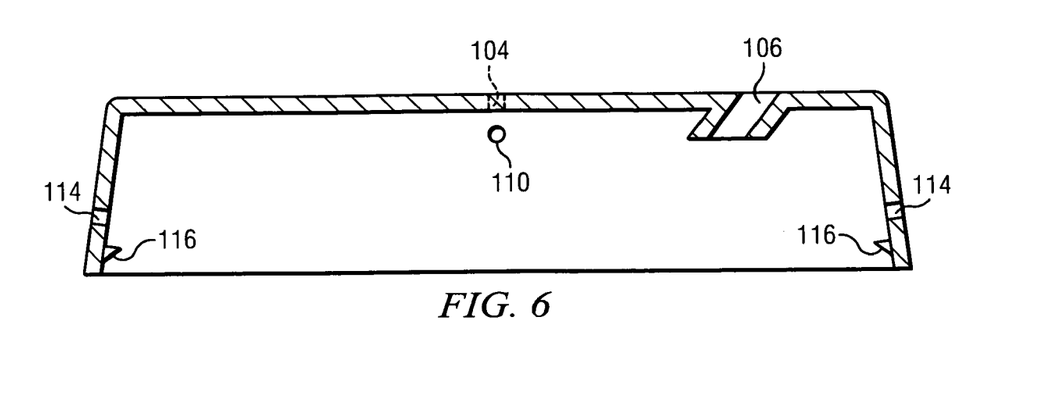
FIG. 6 is a cross section view of the present invention showing the preferred embodiment of the document entry slot of the lockable closure.

As shown in FIG. 6 document entry slot 106 is of an angle to promote ease of document entry and prevent uneven stacking inside receptacle box 200. The appropriate angle should be in the range of 30 to 60 degrees. Those skilled in the art will also observe the inclined angle of the sides of lockable closure 100. The inclined angle should be between 2 and 20 degrees. The incurred angle of the sides provides a close parallel fit between the inside surfaces of the sides of the lockable closure with the exterior surfaces of the box flaps. The close parallelism between the surfaces prevents unwanted deformation and bending of the flaps if improper removal of the lockable closure is attempted. Hence, the secure attachment of the lockable closure to the bottom box is enhanced.

Figure 2:
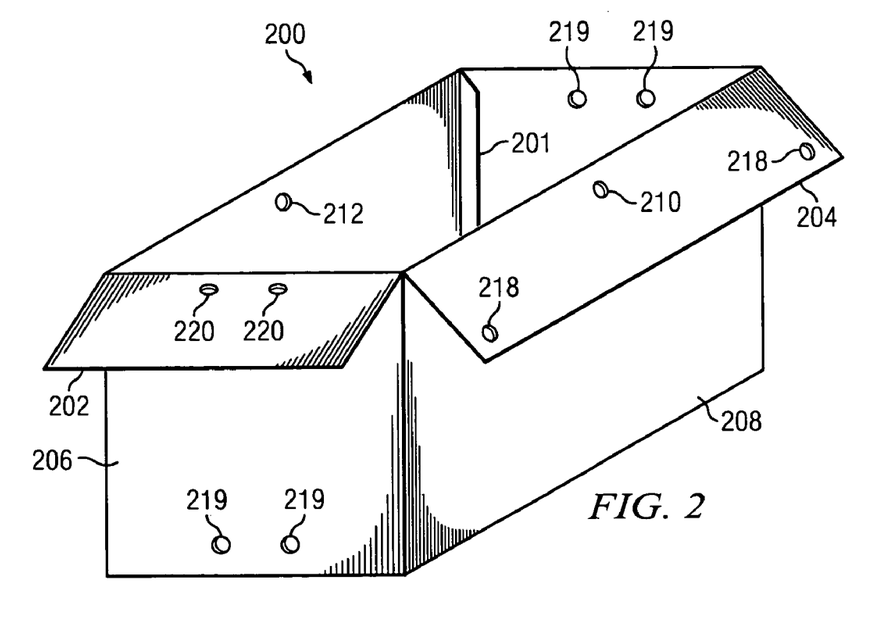
FIG. 2 is an isometric view of a receptacle box in an open position showing box flaps and locking holes.
Figure 3:
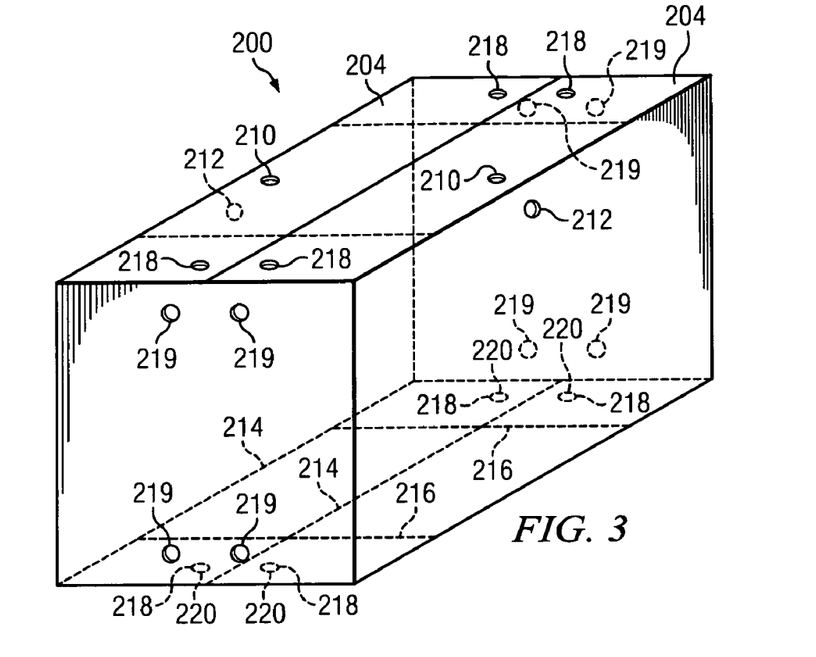
FIG. 3 is an isometric view of a receptacle box in a closed position showing box flaps and locking holes.

FIG. 2 shows receptacle box 200 in an open position. FIG. 3 shows receptacle box 200 in a closed position. Referring then to FIGS. 2 and 3, receptacle box 200 is composed of a material such as corrugated cardboard. In the preferred embodiment, corrugated cardboard is used due to the availability of the material, its affordability, strength, and light weight. Other materials such as polyethylene and polypropylene will suffice. In these embodiments, thicknesses have been found to be preferable in the 10-30 mil. range. In environments where extreme security is required plate steel or stainless steel may be employed. Of course, hinged flaps will be required in these boxes. Receptacle box 200 is typically formed from one piece of die cut material having prefolded creases and a single adhesive overlap 201. The receptacle box comprises two box minor sides 206, two box major sides 208, two box top side flaps 204, two box top end flaps 202, two box bottom side flaps 214, and two box bottom end flaps 216. Other shapes of receptacle box 200 are envisioned by the invention as well. Receptacle box 200 is dimensioned to fit within and engage lockable closure 100.

Each box top side flap 204 has one box top locking hole 210 and two side flap locking holes 218. Each box major side 208 has one box side locking hole 212. In an alternate embodiment the locking holes may be reinforced with metallic eyelets or reinforcing plastic or metallic plates to prevent tear through.

The locations of box top locking hole 210 and box side locking hole 212 correspond to the placement of closure top locking hole 104 and closure side locking hole 110, respectively. When lockable closure 100 is in place on receptacle box 200, closure top locking hole 104 is approximately concentrically aligned with box top locking hole 210. Closure side locking hole 110 will also be approximately concentrically aligned with box side locking hole 212. With lockable closure 100 in place, a non-removable cable tie is used in the preferred embodiment to secure lockable closure 100 to receptacle box 200 by threading it through each set of the aligned locking holes 104, 110, 212, and 210 and securing it together. In the preferred embodiment the cable tie is fitted with a ratchet and pawl mechanism which prevents its removal without cutting.

Each box top end flap 202 has two end flap locking holes 220. Each box bottom end flap 216 also has two end flap locking holes 220. Each box top side flap 204 and each box bottom side flap 214 have two side flap locking holes 218 located near each exterior corner. These holes are used in conjunction with end flap locking holes 220 on each box top end flap 202 and on each box bottom end flap 216. The location of end flap locking holes 220 is such that when the top and bottom end flaps are folded into their respective closed positions, the holes are generally concentrically aligned with the corresponding locking holes from the corners of the top and bottom side flaps in their respective closed positions. In an alternate embodiment each box minor side 206 has four locking holes 219, two near the top and two near the bottom. The location of locking holes 219 is adjacent the flap locking holes when the receptacle box is in its closed position. Cable ties are threaded through the adjacent holes to secure the flaps of the box in a closed position.

Those skilled in the art will recognize that the cable ties can be placed in several patterns to secure the box. For example, a cable tie may be placed between adjacent holes 218, or between adjacent holes 218 and 219. The advantage provided is twofold. First, in situations where extreme security is needed multiple cable ties can be used. Second, if a set of holes is torn through, alternate combinations may be used to secure the box thereby extending the useful life of the receptacle box.

Figure 9A:
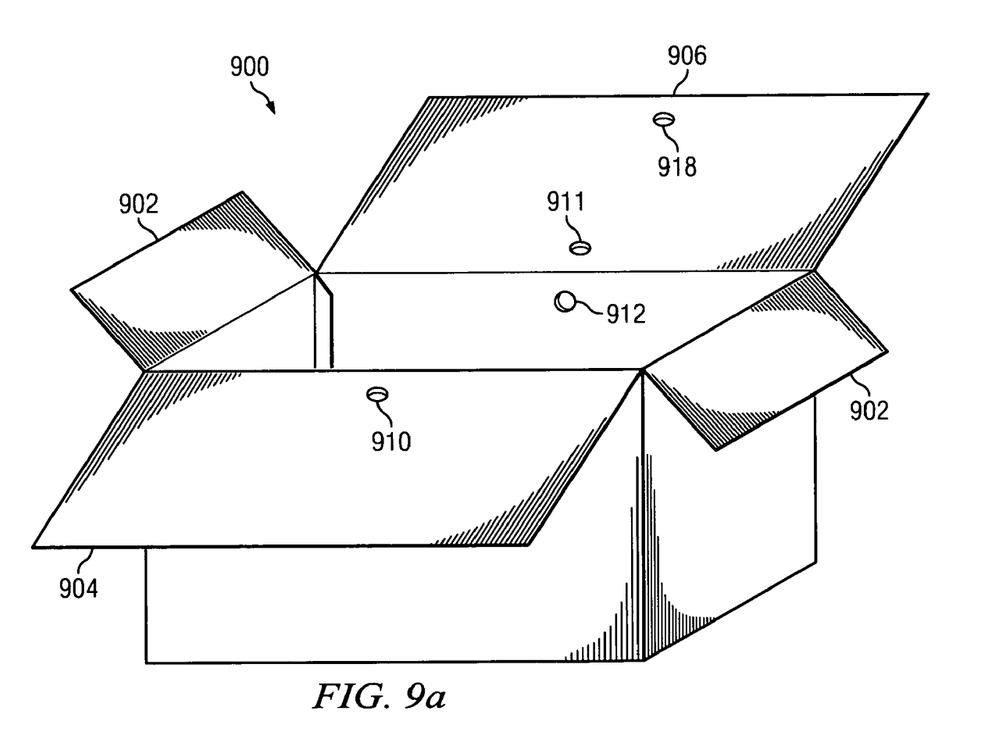
FIG. 9a shows an alternate embodiment of receptacle box in open position.
Figure 9B:
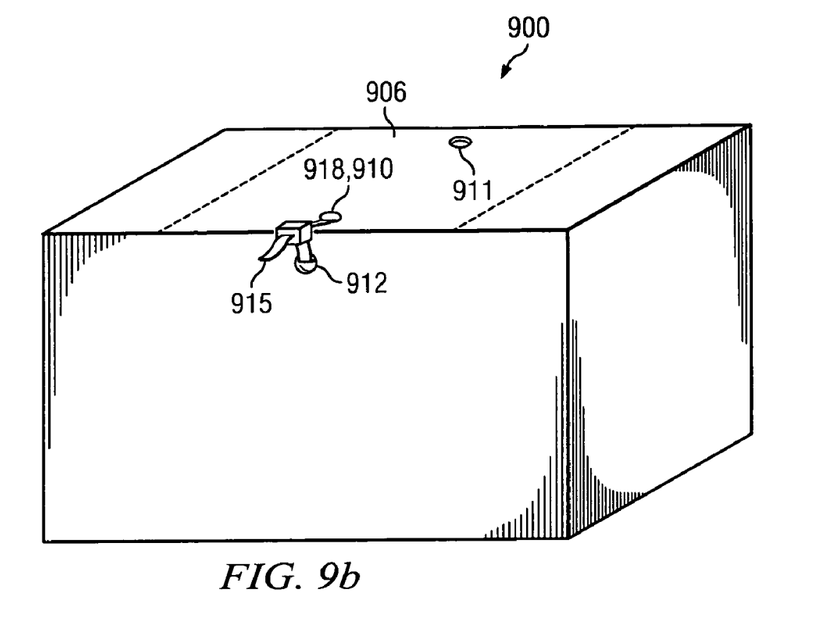
FIG. 9b shows an alternate embodiment of receptacle box in closed position.

FIG. 9a shows yet an additional embodiment of a receptacle box in an open position. The box bottom of receptacle box 900 is of self-assembling design. The self-assembling design removes the need for locking seals on the box bottom. Receptacle box 900 has two end flaps 902 and first side flap 904 and second side flap 906. End flaps 902 are used to engage lockable closure 100. First side flap 904 has one box top locking hole 910. Second side flap 906 has one box top locking hole 911 and one side flap locking hole 918. Box top locking holes 910, 911, and 912 are used to secure lockable closure 100 to receptacle box 900 as in previous embodiment. Both side flaps 904 and 906 are of sufficient dimensions to generally cover the entire top opening of receptacle box 900 individually so when both side flaps 904 and 906 are folded over, first side flap 904 followed by second side flap 906 into closed position, the opening is covered twice. Double coverage provides higher durability and additional security if required. When both side flaps 904 and 906 are folded into closed position, box top locking hole 910 from first side flap 904 and side flap locking hole 918 from second side flap 906 are generally concentrically aligned. In this embodiment one locking seal is required to secure receptacle box 900.

Figure 4:
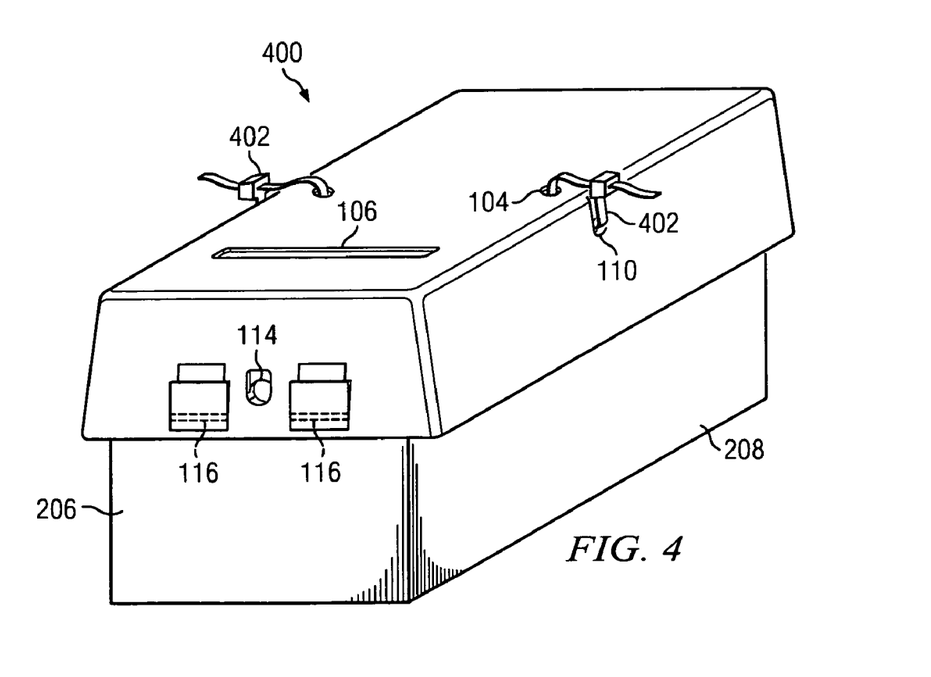
FIG. 4 is an isometric view of one embodiment of the present invention secured to a receptacle box and secured with cable ties.

FIG. 4 shows an embodiment of a receptacle box and lockable closure 100 in the engaged, secured position 400. Cable ties 402 are shown in place through the closure top locking hole 104, box top locking hole 210, box side locking hole 212, and closure side locking hole 110. Receptacle box is ready to receive documents through document entry slot 106. In another embodiment of lockable closure 100, only one set of closure top locking hole 104 and closure side locking hole 110 is required. Accordingly for this embodiment, in conjunction with receptacle box 900 box top locking holes 911 and 912, which correspond to closure side locking hole 110 would not be required. In addition, in conjunction with receptacle box 200 box top locking holes 210 and 212 which also correspond to closure side locking hole 110 would not be required.

Figure 10:
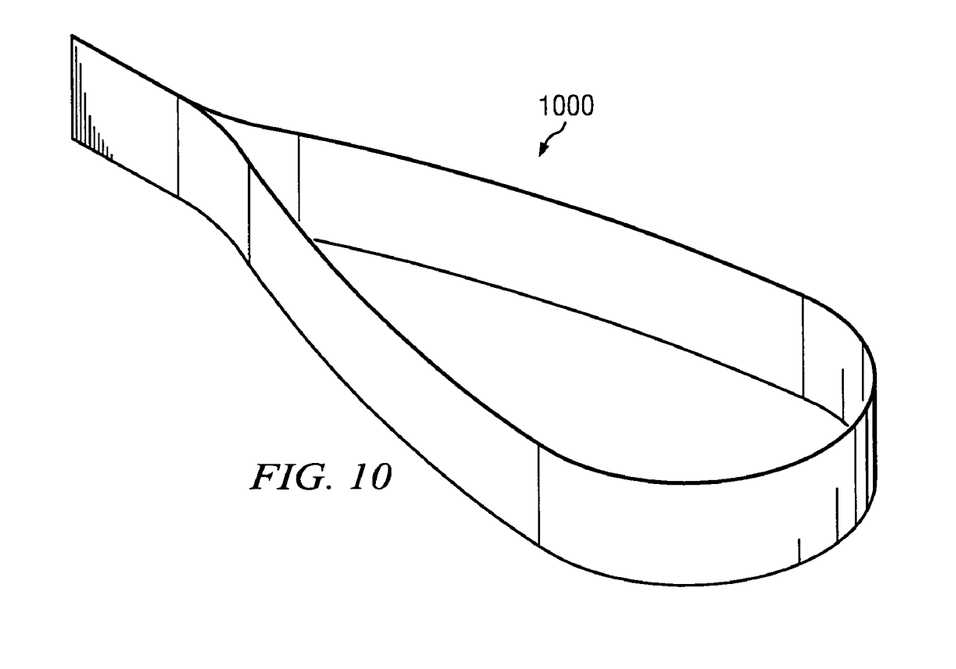
FIG. 10 shows an alternate embodiment of the security closure.

The cable ties provided can be replaced by different mechanisms to secure the lockable closure to the receptacle box in different applications. For example, in high security applications cable ties can be replaced by chromium steel padlocks or combination locks. In light security applications the cable ties may be replaced by security "seals" comprised of destructible paper seals that can be easily broken. FIG. 10 shows another alternative embodiment, the seals can be a Tyvek-style seal 1000 that is impossible to tear but can be cut. The Tyvek style of locking seal 1000 is paper thin, can be easily cut, allows for ease of shipment to system user, and can be further secured by covering with adhesive strips or mailing labels. Tyvek is sold by and is registered trademark of DuPont and its affiliates. In additional alternative embodiments, security seals may be encoded imprinting or bar codes to identify the documents contained and the dates that the receptacle was placed in service.

In yet additional embodiments, the security seal can be a cable tie with an electrical alarm designed to alert a computer or emit an audible tone when removed from the lockable closure.

Figure 8:
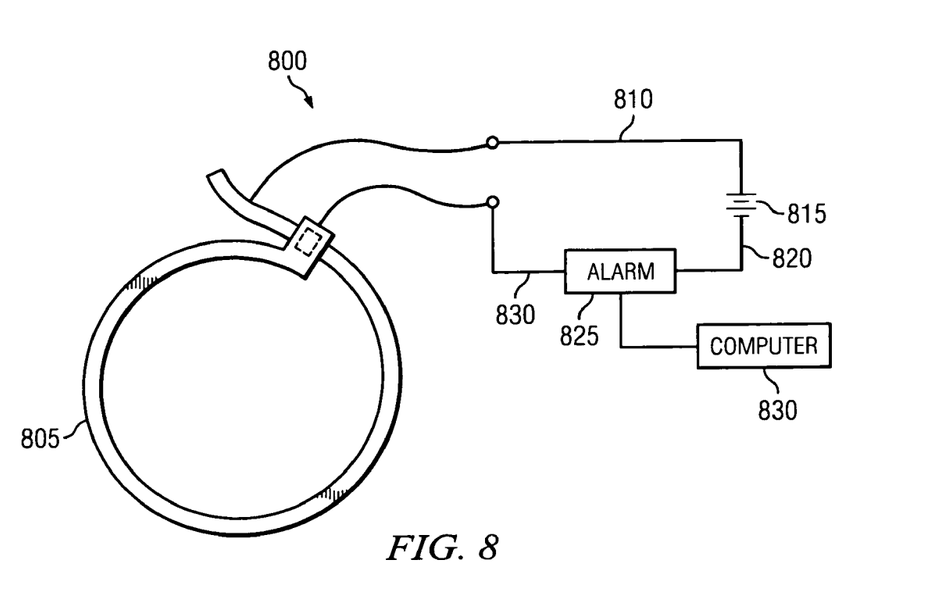
FIG. 8 shows an alternate embodiment of the security closure.

FIG. 8 shows an example of a security seal in conjunction with an electrical alarm is shown as 800. In this embodiment a security seal 805 is provided with an internal conductor (not shown). The internal conductor forms a part of an integral circuit. In the preferred embodiment a connection 810 joins a security seal 805 with power source 815. Connection 820 connects power source 815 with alarm unit 825. Connection 830 connects alarming unit 825 to security seal 805. The alarm unit is designed to monitor a constant voltage potential between connections 810 and 830. When security seal 805 is broken, the voltage potential between connections 810 and 830 changes and the alarm unit responds by activating an audible alarm or sending a data notification to a separate computer system 830. Power source 815 and alarm unit 825 and associated cabling in the preferred embodiment is stored in an interior container rigidly affixed to lockable closure 100.

Figure 7:
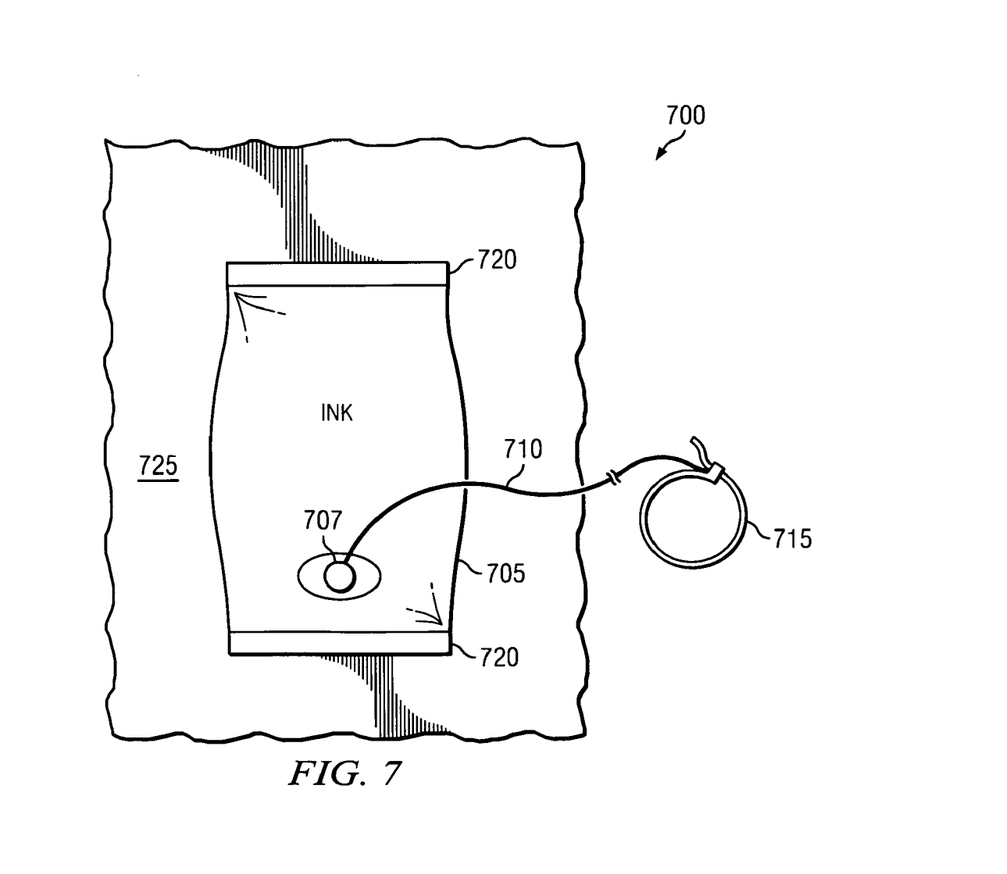
FIG. 7 shows an alternate embodiment of the security closure.

In yet additional embodiments, the cable tie may be replaced by a security seal which releases an ink or dye when removed thereby marking and tainting the receptacle box and contents if the security seal is improperly removed. An example of the security seal which releases an ink or dye is shown at 700 in FIG. 7. A pressurized ink packet 705 is fitted with a removable plug 707. In the preferred embodiment the ink packet is a flexible metalized pouch having a volume of about 2 oz. Ink packet 705 is connected to the interior surface of a receptacle box 725 through adhesive strips 720. Plug 707 is connected to stainless steel cables 710 which is in turn rigidly connected to security seal 715. When security seal 715 is removed tension is placed on cable 710 thereby removing plug 707 and allowing the pressurized ink within ink packet 705 to escape to the interior of the receptacle box, thereby tainting the documents in the interior of the box with an ink or dye.

The preferred method of use of the invention requires first that one of a plurality of receptacle boxes be assembled from a storage position. Referring to FIGS. 2, 3 and 4 to assemble receptacle box 200, box bottom end flaps 216 and box bottom side flaps 214 are folded into the closed position. Box bottom side flaps 214 completely cover box bottom end flaps 216 and end flap locking holes 220 and side flap locking holes 218 will be concentrically aligned. Cable ties are threaded through the concentrically aligned locking holes 218 and secured resulting in a connection that spans from one side flap to the other across the seam created by the edges of box bottom side flaps. Adhesive strips are then placed over the box bottom seam where box bottom side flaps 214 meet and over secured in place by the cable ties. In an alternate embodiment cable ties are added between holes 219, 218 and 220 to secure the bottom of the box.

Figure 5A:
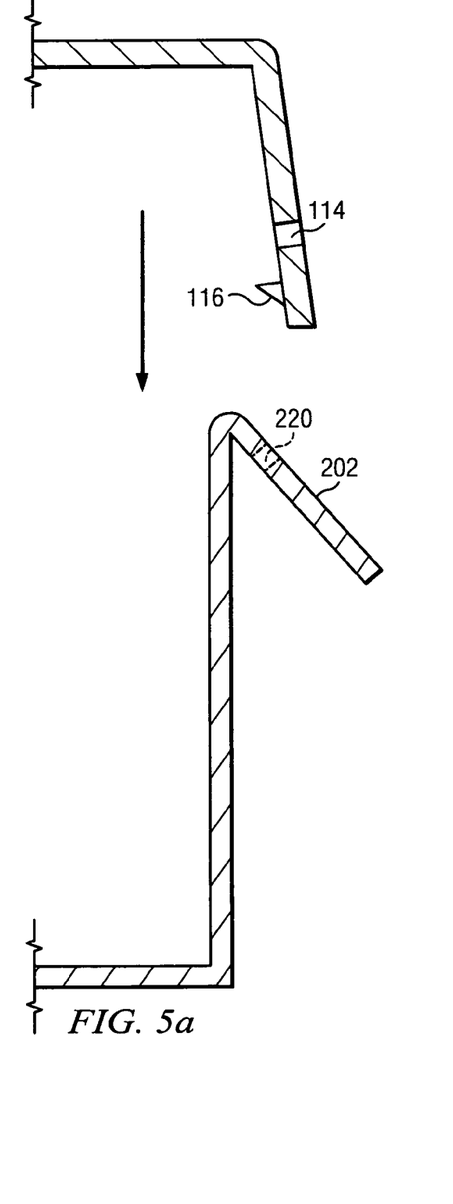
FIG. 5a is a partial cross section view of the exploded parts of a preferred embodiment of the present invention in an open position.
Figure 5B:
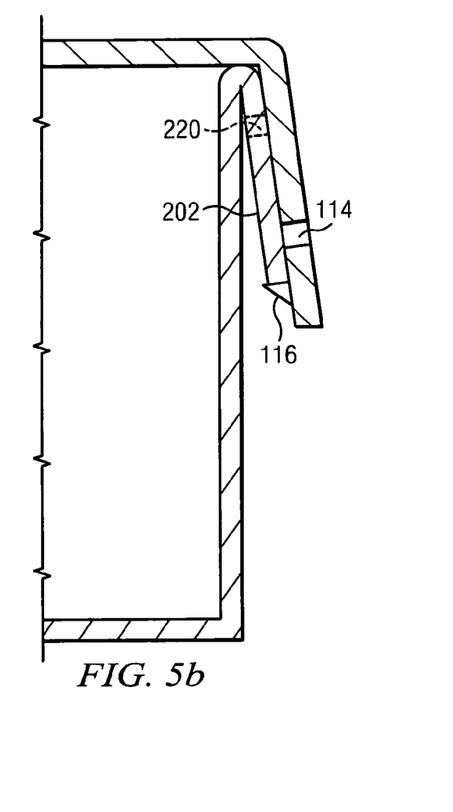
FIG. 5b is a partial cross section view of a preferred embodiment of the present invention in secured position.

The method of use next requires securing the lockable closure to the assembled receptacle box. FIGS. 5*a* and 5*b* show the lockable closure 100 and interior latches 116 before and after engaging box top end flap 202. To secure lockable closure 100 to receptacle box 200, lockable closure 100 is placed over and aligned with receptacle box 200. Box top end flaps 202 and box top side flaps 204 are folded open back against box minor sides 206 and box major sides 208, respectively. By moving lockable closure 100 downward onto receptacle box 200, interior latches 116 engage the outside surfaces of box top end flaps 202, thereby bending box top end flaps 202 against the outside of the receptacle box. The reactive moment force created by bending box top end flaps 202 against the outside of the receptacle box will cause box top end flaps 202 to recoil outwardly. Once interior latches 116 pass below the edge of end flaps 202, box top end flaps 202 will flex outwardly towards the inside surface of closure minor side surface 112 until they are substantially in parallel planes. The surface of interior latches 116 abuts against the edge of folded minor side surface 112 and prevents the removal of lockable closure 100. Box top locking holes 210 and closure top locking holes 104 are concentrically aligned as are box side locking holes 212 and closure side locking holes 110.

Lockable closure 100 is then secured to receptacle box 200 with cable ties 402 fitted through locking holes 104, 110, 210, and 212. The apparatus is now ready to receive confidential documents through document entry slot 106. The slant of the document enter slot forces documents to fall into the interior of the receptacle box and lay flat against the bottom of the box as it is used to gather documents.

In use, when receptacle box 200 becomes full, cable ties 402 are destroyed and a force is exerted through release holes 114 of the lockable closure thereby exerting pressure on box top end flaps 202 and disengaging box top end flaps 202 from interior latches 116. Once box top end flaps 202 have been successfully moved past the end of interior latches 116, lockable closure 100 can be removed by lifting upwardly.

The method then requires closing and securing of the integral top of the receptacle box so that the documents inside may be securely stored or transported. To ensure security and prevent tampering of the articles inside, receptacle box 200 is then secured in its closed position. After removing lockable closure 100, box top end flaps 202 are folded inwardly followed by box top side flaps 204. End flap locking holes 220 and side flap locking holes 218 are concentrically aligned. Cable ties are applied to prevent tampering. Adhesive strips may (but are not required to be) be placed over the box top seam where box top side flaps 204 meet and over cable ties 402 which are secured through locking holes 218 and 220. The closed, sealed receptacle box 200 can now be stored or shipped for destruction.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

The invention claimed is:

1. A system for secure document collection and storage comprising:
   (a) a plurality of receptacle boxes;
   (b) each receptacle box having an interior, a first opposing top flap pivotally adjoined to a first supporting wall, a second opposing top flap pivotally adjoined to a second supporting wall, a third opposing top flap pivotally adjoined to a third supporting wall, and a fourth opposing top flap pivotally adjoined to a fourth supporting wall;
   (c) each receptacle box having an open position and a closed position;
   (d) in the open position, the first opposing top flap having a first hole adjacent a first hole in the first supporting wall;
   (e) in the open position, the second opposing top flap having a second hole adjacent a second hole in the second supporting wall;
   (f) in the closed position, the first opposing top flap having a third hole and a fourth hole adjacent the second opposing top flap;
   (g) in the closed position, the second opposing top flap having a fifth hole adjacent the third hole and a sixth hole adjacent the fourth hole;
   (h) a reusable security closure, adjacent one of the plurality of receptacle boxes in the open position;
   (i) the reusable security closure having a slot for admission of documents in ducted communication with the interior of the one of the plurality of receptacle boxes;
   (j) the reusable security closure having a top, a first side connected to the top and a second side connected to the top opposing the first side, a third side connected to the top and a fourth side connected to the top opposing the third side;
   (k) the third side having a first releasable latch means adjacent the third opposing top flap when the one of the plurality of receptacle boxes is in its open position;
   (l) the fourth side having a second releasable latch means adjacent the fourth opposing top flap when the one of the plurality of receptacle boxes is in its open position;
   (m) the top having a first hole adjacent the first side;
   (n) the top having a second hole adjacent the second side;
   (o) the first side having a first hole adjacent the top;
   (p) the second side having a second hole adjacent the top;
   (q) the first hole adjacent the first side and the first hole adjacent the top corresponding to the first hole in the first supporting wall and the first hole in the first opposing top flap;
   (r) the second hole adjacent the second side and the second hole adjacent the top corresponding to the second hole in the second supporting wall and the second hole in the second opposing flap;
   (s) a first destructible security seal within the first hole adjacent the first side, the first hole adjacent the top, the first hole in the first supporting wall and the first hole in the first opposing top flap when the one of the plurality of receptacle boxes is in the open position;
   (t) a second destructible security seal within the second hole adjacent the second side, the second hole adjacent the top, the second hole in the second supporting wall and the second hole in the second opposing flap when the one of the plurality of receptacle boxes is in the open position;
   (u) a third destructible security seal within the third hole in the first opposing flap and the fifth hole of the second opposing flap when the one of the plurality of receptacle boxes is in the closed position; and,
   (v) a fourth destructible seal within the fourth hole in the first opposing flap and the sixth hold of the second opposing flap when the one of the plurality of receptacle boxes is in its closed position.

2. The system of claim 1 wherein the slot is canted with respect to the top.

3. The system of claim 1 wherein the first destructible security seal further comprises an ink reservoir for ejecting a die when the destructible seal is destroyed.

4. The system of claim 1 wherein the first destructible security seal further comprises:
   data communication means for transmitting a signal to a computer when the destructible seal is destroyed.

5. The system of claim 1 wherein the first destructible security seal further comprises:
   a cable tie.

6. The system of claim 1 wherein the first destructible security seal further comprises:
   a Tyvek seal.

7. The system of claim 1 wherein the first destructible security seal further comprises:
   an audible alarm activated when the destructible seal is destroyed.

8. The system of claim 1 wherein each of the plurality of receptacle boxes has a first opposing bottom flap and a second opposing bottom flap; and
   the first bottom flap is joined to the second bottom flap by a fifth destructible seal.

9. The system of claim 1 wherein the first releasable latch means further comprises a first angled latch surface adjacent the third opposing flap; and
   the second releasable latch means further comprises a second angled latch surface adjacent the fourth opposing flap.

10. The system of claim 1 wherein the third destructible security seal further comprises an ink deployment means for ejecting a die when the destructible seal is destroyed.

11. The system of claim 1 wherein the third destructible security seal further comprises:
    data communication means for transmitting a signal to a computer when the destructible seal is destroyed.

12. The system of claim 1 wherein the third destructible security seal further comprises:
a cable tie.

13. The system of claim 1 wherein the third destructible security seal further comprises:
a Tyvek seal.

14. The system of claim 1 wherein the third destructible security seal further comprises:
An audible alarm activated when the destructible seal is destroyed.

15. A system for secure document collection and storage comprising:
(a) a plurality of receptacle boxes;
(b) each receptacle box having an interior, a first opposing top flap pivotally adjoined to a first supporting wall, a second opposing top flap pivotally adjoined to a second supporting wall, a third opposing top flap pivotally adjoined to a third supporting wall, and a fourth opposing top flap pivotally adjoined to a fourth supporting wall;
(c) each receptacle box having an open position and a closed position;
(d) in the open position, the first opposing top flap having a first hole adjacent a first hole in the first supporting wall;
(e) in the open position, the second opposing top flap having a second hole adjacent a second hole in the second supporting wall;
(f) in the closed position, the second opposing top flap having a third hole concentrically aligned with first hole of first opposing top flap;
a reusable security closure, adjacent the one of the plurality of receptacle boxes in the open position;
(h) the reusable security closure having a slot for admission of documents in ducted communication with the interior of the one of the plurality of receptacle boxes;
(i) the reusable security closure having a top, a first side connected to the top and a second side connected to the top;
(j) the first side having a first releasable latch means adjacent the third top flap when the one of the plurality of receptacle boxes is in its open position;
(k) the second side having a second releasable latch means adjacent the fourth top flap when the one of the plurality of receptacle boxes is in its open position;
(l) the top having a first hole adjacent the first side;
(m) the top having a second hole adjacent the second side;
(n) the first side having a first hole adjacent the top;
(o) the second side having a second hole adjacent the top;
(p) the first hole adjacent the first side and the first hole adjacent the top corresponding to the first hole in the first supporting wall and the first hole in the first opposing top flap;
(q) the second hole adjacent the second side and the second hole adjacent the top corresponding to the second hole in the second supporting wall and the second hole in the second opposing flap when one of the plurality of receptacle boxes is in the open position;
(r) a first destructible security seal within the first hole adjacent the first side, the first hole adjacent the top, the first hole in the first supporting wall and the first hole in the first opposing top flap when one of the plurality of receptacle boxes is in the open position;
(s) a second destructible security seal within the second hole adjacent the second side, the second hole adjacent the top, the second hole in the second supporting wall and the second hole in the second opposing flap;
(t) a third destructible security seal within the third hole in the second opposing flap, the first hole of the first opposing flap, and the first hole of the first supporting wall when the one of the plurality of receptacle boxes is in the closed position.

16. The system of claim 15 wherein the slot is canted with respect to the top.

17. The system of claim 15 wherein the first destructible security seal further comprises:
a cable tie.

18. The system of claim 15 wherein the first destructible security seal further comprises:
a Tyvek seal.

19. The system of claim 15 wherein the first releasable latch means further comprises a first angled latch surface adjacent the third opposing flap; and
the second releasable latch means further comprises a second angled latch surface adjacent the fourth opposing flap.

20. The system of claim 15 wherein the third destructible security seal further comprises:
a cable tie.

21. The system of claim 15 wherein the third destructible security seal further comprises:
a Tyvek seal.

22. A system for secure document collection and storage comprising:
(a) a plurality of receptacle boxes;
(b) each of the plurality of receptacle boxes comprising an integral box top closure having an open position and a closed position;
(c) a security closure removably attached to at least one of the plurality of receptacle boxes when the integral box top closure on the at least one of the receptacle boxes is in the open position;
(d) a document slot in the security closure in ducted communication with the interior of the at least one of the receptacle boxes; and
(e) a first destructible seal means for joining the security closure to the at least one of the plurality of receptacle boxes, when the box top closure of the at least one of the plurality of receptacle boxes is in the open position.

23. The system of claim 22 further comprising at least one second destructible seal means for joining the integral box top closure to the at least one of the plurality of receptacle boxes when the at least one of the plurality of receptacle boxes is in the open position.

24. The system of claim 23 wherein the second destructible seal means is a cable tie.

25. The system of claim 23 wherein the second destructible seal means is a lockable closure.

26. The system of claim 23 wherein the second destructible seal means is an ink deployment seal.

27. The system of claim 23 wherein the second destructible seal means is a Tyvek seal.

28. The system of claim 23 wherein the security closure further comprises a latch means engaging a flap of the box top closure of at least one of the plurality of receptacle boxes.

29. The system of claim 23 wherein the at least one of second destructible seal means comprises:
(a) a first hole in a first flap on the at least one of the plurality of receptacle boxes;
(b) a second hole in a second flap on the at least one of the plurality of receptacle boxes; and
(c) a removable sealing ring within the first hole and the second hole.

30. The system of claim 23 wherein the at least one of second destructible seal means comprises:
  (a) a first hole in a first flap on the at least one of the plurality of receptacle boxes;
  (b) a second hole in a second flap on the at least one of the plurality of receptacle boxes;
  (c) a third hole in a side of the at least one of the plurality of receptacle boxes;
  (d) a fourth hole in the side of the at least one of the plurality of receptacle boxes;
  (e) a first removable sealing ring within the first hole and the third hole; and
  (f) a second removable sealing ring within the second hole and the fourth hole.

31. The system of claim 22 wherein the first destructible seal means is a cable tie.

32. The system of claim 22 wherein the first destructible seal means is a lockable closure.

33. The system of claim 22 wherein the first destructible seal means is an ink deployment seal.

34. The system of claim 22 wherein the first destructible seal means is a Tyvek seal.

35. The system of claim 22 wherein the document slot includes an angled chute surface for guiding documents to a flat resting position.

36. The system of claim 22 wherein the each of the plurality of receptacle boxes includes an integral box bottom closure further comprising:
  (a) at least one third destructible seal means for sealing at least one integral box bottom closure to the at least one of the plurality of receptacle boxes.

37. The system of claim 22 further comprising:
  the security closure is made of a different material than the plurality of receptacle boxes.

38. The system of claim 37 further comprising:
  the security closure is made of a rigid plastic and the plurality of receptacle boxes is made of corrugated cardboard.

39. A method of secure document collection comprising the steps of:
  (a) providing a plurality of receptacle boxes;
  (b) providing an integral top closure on each of the plurality of receptacle boxes, each top closure having an open position and a closed position;
  (c) providing a security closure having an attachment means for removable attachment to at least one of the receptacle boxes and a document slot;
  (d) choosing the at least one of the receptacle boxes;
  (e) placing the top closure of the at least one of the receptacle boxes in the open position;
  (f) engaging the security closure to the at least one of the receptacle boxes adjacent the top closure;
  (g) securing the security closure to the top closure with a first destructible seal;
  (h) placing at least one document in the document slot;
  (i) destroying the first destructible seal;
  (j) disengaging the security closure from the at least one of the receptacle boxes;
  (k) placing the top closure of the at least one of the receptacle boxes in the closed position;
  (l) securing the integral top closure with a second destructible seal; and
  (m) repeating steps d through m with another of the plurality of receptacle boxes.

40. The method of claim 39 comprising the further steps of:
  (a) destroying the second destructible seal;
  (b) placing the top closure of the at least one receptacle box in the open position; and
  (c) destroying the at least one document.

41. The method of claim 39 further comprising the step of:
  transporting the at least one receptacle box.

42. The method of claim 39 further comprising the step of:
  the first destructible seal comprising an audible alarm, sounding the alarm as the step of destroying the first destructible seal is taken.

43. The method of claim 39 further comprising the step of:
  the first destructible seal comprising an ink reservoir for ejecting a dye, tainting the at least one document with the dye as the step of destroying the first destructible seal is taken.

* * * * *